United States Patent Office 3,694,298
Patented Sept. 26, 1972

3,694,298
DECORATED GYPSUM BOARD AND METHOD OF MAKING SAME
William C. Veschuroff, Palatine, and Robert M. Mustoe, Winnetka, Ill., assignors to United States Gypsum Company, Chicago, Ill.
No Drawing. Continuation of application Ser. No. 604,647, Dec. 27, 1966. This application May 8, 1970, Ser. No. 35,887
Int. Cl. B32b 29/04; E04c 2/10
U.S. Cl. 161—43                              7 Claims

ABSTRACT OF THE DISCLOSURE

A porous decorated paper is made by first coating and then embossing a paper sheet, and a predecorated gypsum board is made utilizing such paper as one of the cover sheets.

---

This application is a continuation of our application Ser. No. 604,647, filed Dec. 27, 1966, now abandoned.

This invention relates to gypsum board having a decorated surface formed thereon prior to manufacture of the board. The manufacture of gypsum boards is well known and such boards are widely used in the building art, such as for wallboards and the like. Gypsum boards are made by enclosing an aqueous calcined gypsum (calcium sulfate hemihydrate) slurry between paper surfaces to form a continuous sheet of a general thickness of about ¼ to about ¾ inch. When the calcined gypsum slurry sets the continuous sheet is cut into boards usually between 8 to 12 feet in length. These boards pass through a dryer in which the water is removed at a very fast rate by means of heat. The fast rate of drying is dependent upon good moisture transmission from the set aqueous calcined gypsum slurry through the paper. If the rate of drying is reduced to great extent considerable difficulty may be encountered with the board such as, for example, the cover paper sheets may separate from the core in spots to form a continuous sheet of a general thickness of about known as "paper blows." Also, substantial variation in the passage of moisture through the opposite faces may result in warping.

It is often desirable to improve the appearance or other properties of the paper surface of a gypsum board or wallboard. This can be done after the board has been made without difficulty, but it is obviously desirable to improve the appearance of the board by decorating the face cover prior to manufacture of the board. However, treatment of the paper surface before formation into a board causes manufacturing problems since modification of the face paper such as by application of a coating thereto greatly affects the passage of moisture therethrough during drying of the board with the incursion of difficulties previously noted. At present, the usual method of improving the surface of a gypsum board is to laminate a sheet of material such as paper, vinyl or plastic to the exposed surface of the dried board. Thus, for example, a wood-grain effect has been achieved in the past by laminating thin wood veneer or paper sheets printed with a wood-grain design to the face sheet of a completed board. Likewise, other designs in paper, palstic or fabric of various types have been used as a lamina. A coated paper is usually the lamina of choice when a low cost product is desired. The application of a predecorated lamina to the face cover of a dried board involves operations which are slow and relatively expensive due to the extra handling, slow line speeds, adhesive and other material costs. Thus, predecoration of the surface of the paper prior to its formation into a gypsum board constitutes a significant desideratum.

Past attempts in the art to predecorate the face paper of a gypsum board with a coating prior to its use in the formation of a gypsum wallboard have not been completely successful since these coatings seriously lower the rate of the passage of the water therethrough from the core so that blisters, paper blows or warping occur.

It is therefore an object of this invention to provide a method of manufacturing a gypsum wallboard in which at least one of the paper sheets which are used to encase the aqueous calcined gypsum slurry is predecorated before forming into a wallboard.

It is another object of this invention to provide a gypsum wallboard in which at least one of the paper cover sheets has a decorated surface which is integral with the surface fibers of the paper.

It is a still further object of this invention to provide an embossed cover sheet for gypsum board having an aesthetically improved surface, which paper can be used in the production of a gypsum board without substantial change in the gypsum board manufacturing procedure.

It is another object of this invention to aesthetically improve the surface of a paper cover sheet for gypsum board prior to formation of the board without adversely affecting the tensile strength of said paper and hence that of the board.

It is a still further object of this invention to provide a porous, decorated paper sheet.

It is yet another object of this invention to decorate a paper sheet with a coating which makes the sheet less porous and then to make the coated sheet more porous by embossing the coated surface thereof.

Other objects and advantages of the present invention will be readily apparent from the following description and claims.

In accordance with one embodiment of this invention paper commonly used in the manufacture of gypsum board is given a decorative treatment to improve the appearance thereof prior to its use in formation of gypsum board. A variety of decorative treatments can be achieved, such as, for example, printed floral patterns, basket weave, cross-hatched or lined patterns as well as solid colors can be applied to cover paper. Likewise, the paper can be treated to simulate a wood-grain effect by appropriate ink printing with the printed surface then preferably being protected by application thereto of a suitable transparent coating. Many paper coating materials suitable for this purpose are known in the art. Thus, for example, the protective coating material can comprise drying oils, conventional resin, varnish and lacquer coatings and the like. After the paper surface receives a desired decoration or decorative effect the so-treated paper is embossed. Embossing of the treated paper is an important feature of the present invention since embossing controls the porosity of the treated paper enabling it to be used satisfactorily in the production of gypsum board. The embossing operation can be accomplished by means of conventional embossing equipment and is carried out to such an extent that the rate of water vapor transmission through the treated paper is sufficiently high as to permit satisfactory manufacture of the gypsum board. As mentioned above, paper blows as well as blisters, peelers and so forth are often experience because the moisture content in the gypsum core cannot pass at a sufficiently high rate through the paper cover sheets during drying of the gypsum board.

An indication of the rate at which moisture will pass through the paper cover sheet during drying of the board, that is, the paper porosity, can be approximated by comparing the rate at which air will pass therethrough. A standard method for determining this rate of flow and designated as "porosity" has been developed using a Gurley Densometer in accordance with Technical Association of the Pulp and Paper Industry (TAPPI) Standards T460m-49. The porosity value is the reported number of seconds required for 100 cubic centimeters of air to pass through the paper under standard conditions. Using this method it has been found that a porosity value of over 300 seconds per 100 cubic centimeters will in a great number of gypsum board plants, particularly those utilizing high speed drying means, result in difficulites with respect to paper blows, peelers, blisters and so forth. In certain gypsum board plants which utilize slower drying rates, the rate of transmission of water vapor through the paper can be somewhat slower and the Gurley value may be as high as 400 seconds per 100 cubic centimeters. Obviously, extremely slow drying of the gypsum boards is something to be avoided since slow drying seriously reduces the output of the plant. Decorative treatment of a paper cover sheet and particularly application of a protective coating thereto greatly lowers the porosity of the paper; often from a normal value of 150–200 seconds to a value of at least about 500 seconds. In accordance with this invention we have found that embossing effectively increases the porosity of the decorated paper cover sheets. With this technique it is now possible to predecorate paper cover sheets prior to formation of gypsum board. Preferably the embossing is conducted so as to result in a porosity in the paper of a Gurley porosity value of not more than 400 seconds per 100 cubic centimeters and more preferably a Gurley value of about 150–200 seconds.

A variety of embossing techniques can be employed with the embossing being carried out to achieve a desired porosity in the decorated paper cover sheets. As used herein, embossing means treating the paper so as to raise and/or lower the normal surface of the paper. Thus, the embossing can be accomplished using screens, by pebble embossing, or with conventional embossing rolls of various designs. The embossing operation can be repeated several times to achieve the desired porosity but obviously the embossing should not be carried out to such an extreme extent as to impair the tensile strength of the paper cover sheet so as to thereby affect the quality of the final gypsum board.

Most preferably the embossing means will be chosen so as to complement or enhance the desired decorative effect. The purpose of the embossing is to control the porosity of the paper and thus one practicing the present invention can routinely determine the type of embossing means to employ as well as the extent of embossing required in a particular case, taking into consideration the type and thickness of the decorative coating on the paper, the original porosity of the paper, the porosity of the decorated paper and the final porosity desired. Generally, shallow relief embossing adequately controls the porosity of the paper without materially reducing the strength thereof.

The following represents one specific preferred embodiment of the invention:

Rolls of regular manila faced chip paper of the type normally used in the manufacture of gypsum board were printed with a cherry, teak or walnut veneer to simulate wood-grain designs upon a conventional four color gravure printing press. The inked paper surfaces were then protected by application of a topcoat of a nitrocellulose lacquer. The decorative coatings so obtained were washable. Using the standard test described above, the Gurley porosity value increased from between 100 to 150 seconds per 100 cubic centimeters before coating to at least about 500 seconds per 100 cubic centimeters after coating. Obviously a paper of this latter porosity could not be satisfactorily employed on the usual gypsum board machines.

Accordingly, the paper was passed through a pair of standard paper embossing rolls to form grooves in the surface of the paper parallel to its length which blended well with and actually augmented the wood-grain design. This treatment reduced the Gurley porosity value to between about 200 and 300 seconds per 100 cubic centimeters. The embossing increased the caliper of the paper less than 0.005 inch. Often the coating plus the embossing increases the thickness no more than about .004 inch, yet the porosity value would be increased sufficiently to render the paper suitable for substantially full scale production.

The decorated paper was then used as the face paper in the formation of a ⅜ inch thick gypsum board. These gypsum boards were manufactured in normal manner using a conventional gypsum board machine by placing an aqueous calcined gypsum slurry in a continuous manner between two paper sheets, one being the decorated face sheet and a back cover sheet which was not predecorated. After the calcined gypsum set, individual boards were formed therefrom and dried in a kiln at high temperatures. Substantially no changes were made in the operating procedure for manufacturing gypsum board when the rolls of the above wood-grain designs were made into boards. Hundreds of thousands of square feet of attractive wood-grain simulating predecorated gypsum board were made without any difficulty as to bond or production details.

It will be apparent from the foregoing that the scope of this invention is not limited to the particular embodiment set forth above. Predecorated gypsum board can also be made in which the paper is predecorated by various means other than by rotogravure printing. Various paint, indicia and other decorating means can be utilized to treat the surface of the paper prior to formation into gypsum board. Likewise, a variety of paper coating materials can be utilized as a protective coating for the decorated surface and the treated paper subsequently embossed to increase the porosity to a level which will enable the paper to be formed satisfactorily into a gypsum wallboard.

The following table summarizes porosity and strength data compiled regarding various types of coatings applied over regular manila faced gypsum board paper; the coated papers were embossed with either a wire screen in a press to give a pleasing wire screen texture upon the surface or a different texture of a light pitular or random tick design was achieved by pressing sandpaper into the paper surface. These embodiments of the invention differ from the preferred embodiment described in which a wood-grain design was first formed upon the paper in ink by printing which was subsequently covered with a transparent protective coating with the paper then being embossed.

Porosity and strength data for predecorated gypsum board paper with various type of coatings and embossed textures

| Type of coating | Type of emboss. | Amount coating, lbs./M sq. ft. | Porosity Gurley Before coating sec. | Porosity Gurley After coating sec. | Porosity Gurley After coating sec. and emboss. | Tensile strength of paper after emboss., lbs./in. of width Machine direct. | Tensile strength of paper after emboss., lbs./in. of width Cross direct. |
|---|---|---|---|---|---|---|---|
| None | Random tick | | 170 | | 136 | 80.1 | 23.3 |
| | Wire screen | | 150 | | b 126 | 84.7 | 21.6 |
| Satin varnish alkyd base paint | Random tick | 1.8 | 147 | 772 | 229 | 74.2 | 23.3 |
| | | 2.0 | 137 | 720 | 203 | 76.7 | 24.2 |
| | Wire screen | 1.3 | 129 | 752 | b 190 | 87.3 | 21.2 |
| | | 1.8 | 143 | 816 | b 286 | 92.4 | 22.9 |
| Polyvinyl chloride base lacquer | Random tick | 1.3 | 145 | 796 | 256 | 91.1 | 25.8 |
| | | 1.5 | 198 | 1,100 | a 212 | 73.3 | 25.0 |
| | Wire screen | 1.1 | 156 | 808 | c 274 | 78.4 | 21.2 |
| | | 1.1 | 131 | 756 | c 250 | 78.4 | 21.2 |
| Semi-gloss enamel soya alkyd base | Random tick | 1.7 | 171 | 880 | a 190 | 80.1 | 26.7 |
| | | 1.2 | 172 | 704 | 266 | 87.7 | 26.3 |
| | Wire screen | 1.6 | 131 | 960 | b 308 | 92.8 | 26.7 |
| | | 1.3 | 124 | 780 | b 282 | 103.8 | 25.0 |
| Casein water base paint | Random tick | 1.5 | 142 | 330 | 133 | 79.7 | 21.6 |
| | | 1.3 | 160 | 368 | 125 | 79.7 | 22.0 |
| | Wire screen | 1.4 | 156 | 356 | 219 | 95.8 | 24.6 |
| | | 1.6 | 142 | 310 | 180 | 90.2 | 22.9 | a 2 additional embossing passes.
b 4 additional embossing passes.
c 12 additional embossing passes.

All of the above papers with the embossed coatings can be run satisfactorily on a conventional gypsum board machine without any substantial change in operating procedure. The average tensile strength in the machine direction of the paper before coating and embossing was 91.8 lbs./in. of width, while the average cross direction tensile strength was 24.1 lbs./in. of width for a paper thickness of about 0.02 inch. From the data it will be noted that predecoration of the paper did not significantly reduce the tensile strength of the paper. Obviously, if greater tensile strength is desired paper cover sheets having a thickness greater than the above papers can be utilized in accordance with the invention.

The advantages of the present invention will be apparent from the foregoing. By means of the present invention paper sheets employed as cover sheets in gypsum board can be predecorated, that is, the surface thereof can be treated as desired to improve the appearance of the board. The decorative effect imparted to the surface of the board can be widely varied and thus decorated paper can be used to form attractive gypsum boards without substantial changes in the normal gypsum board manufacturing operation. The decorative treatment of the cover paper while serving primarily to improve the paper surface from an aesthetic standpoint can also serve other functions such as increasing the water resistance of the board, facilitation in cleaning thereof and so forth.

Those modifications and equivalents which fall within the spirit of the invention and the scope of the appended claims are to be considered part of the invention.

We claim:

1. In a process for the manufacture of gypsum board in which an aqueous calcined gypsum slurry is placed between paper cover sheets pervious to the passage of moisture vapor, the calcined gypsum is permitted to set, and the excess moisture is removed by drying at elevated temperatures, the improvement which comprises the steps of applying to one surface of one of said cover sheets, prior to said placing step, a decorative coating, whereby the porosity value of said sheet is increased, and thereafter reducing the porosity value of said sheet by embossing the coated surface thereof over substantially its entire area, and utilizing said sheet as one of the cover sheets upon which the slurry is placed.

2. The process claimed in claim 1 wherein the initial porosity of said cover sheets is on the order of 150–200 seconds, the increase in porosity value of said sheet after coating is at least about 200 seconds, and the porosity value of said coated sheet after embossing is less than about 300 seconds, the porosity values each being determined in accordance wtih TAPPI method T460m–49.

3. The process claimed in claim 2 wherein the increase in porosity value of said sheet after coating is at least about 500 seconds.

4. A decorated gypsum board characterized by a steam-porous surface, which board comprises a set gypsum core between paper cover sheets adhering thereto, at least one of said cover sheets bearing on its exposed surface a decorative treatment including a protective coating on the sheet and a substantially overall embossment of the coating.

5. A decorated gypsum board which comprises a set gypsum core between paper cover sheets adhering thereto, at least one of said cover sheets bearing on its exposed surface a decorative treatment comprising a paper sheet having a protective coating thereover selected from the group consisting of a drying oil, varnish, lacquer, casein water base paint, and enamel, said paper sheet and coating being embossed over substantially their entire surface.

6. The board as defined in claim 5, wherein said one coated and embossed sheet has a porosity value of less than about 300 seconds, as determined by TAPPI method T460m–49.

7. The board as defined in claim 4, wherein the porosity value of said cover sheet is less than about 300 seconds, as determined by TAPPI method T460m–49.

References Cited

UNITED STATES PATENTS 2,705,682   4/1955   Wille _____ 117—11
2,815,297   12/1957  Herrlinger _____ 117—11
2,585,109   2/1952   Gordon _____ 117—10

PHILIP DIER, Primary Examiner

U.S. Cl. X.R.

52—309; 117—11; 156—44, 219; 161—130, 138, 270

PO-1050
(5/69)

UNITED STATES PATENT OFFICE
CERTIFICATE OF CORRECTION

Patent No. 3,694,298                     Dated September 26, 1972

Inventor(s) W. C. Veschuroff et al.

It is certified that error appears in the above-identified patent and that said Letters Patent are hereby corrected as shown below:

Col. 1, line 41 should read -- to form blisters or completely separate to form what is --.

Col. 1, line 63, "palstic" should be -- plastic --.

Col. 3, line 9, "experience" should read -- experienced --.

Signed and sealed this 13th day of February 1973.

(SEAL)
Attest:

EDWARD M. FLETCHER, JR.          ROBERT GOTTSCHALK
Attesting Officer                Commissioner of Patents